United States Patent [19]
Sakamoto et al.

[11] Patent Number: 6,068,932
[45] Date of Patent: May 30, 2000

[54] THERMOSETTING RESIN COMPOSITION

[75] Inventors: Michie Sakamoto; Amane Mochizuki; Masahiro Yoshioka; Yuji Hotta, all of Osaka, Japan

[73] Assignee: Nitto Denko Corporation, Osaka, Japan

[21] Appl. No.: 09/053,782

[22] Filed: Apr. 2, 1998

[30] Foreign Application Priority Data

Apr. 4, 1997 [JP] Japan ................................. 9-102766

[51] Int. Cl.⁷ .......................... C08L 79/08; C09J 179/00; C09J 179/08
[52] U.S. Cl. ................. 428/473.5; 428/355 CN; 428/355 N; 528/310; 528/322
[58] Field of Search ................. 428/473.5, 355 CN, 428/355 N; 528/310, 320, 322

[56] References Cited

U.S. PATENT DOCUMENTS

| | | | |
|---|---|---|---|
| 4,169,866 | 10/1979 | von Bonin et al. | 525/131 |
| 5,576,398 | 11/1996 | Takahashi et al. | 525/528 |
| 5,830,949 | 11/1998 | Mochizuki et al. | 525/452 |
| 5,859,170 | 1/1999 | Sakamoto et al. | 528/170 |

FOREIGN PATENT DOCUMENTS

| | | |
|---|---|---|
| 0 557 906 | 9/1993 | European Pat. Off. . |
| 62-1714 | 1/1987 | Japan . |
| 5-239427 | 9/1993 | Japan . |
| 5-320611 | 12/1993 | Japan . |
| WO 95/02627 | 1/1995 | WIPO . |

OTHER PUBLICATIONS

D. Lyman et al., "Die Makromolekulare Chemie", Polycarbodiimides and their Derivatives, Band 67, Apr. 1963, pp. 1–8.

T. Campbell et al., "High Polymers Containing the Carbodiimide Repeat Unit", The Journal of Organic Chemistry, vol. 28, No. 8, Aug. 1963, pp. 2069–2075.

*Primary Examiner*—Daniel Zirker
*Attorney, Agent, or Firm*—Sughrue, Mion, Zinn, Macpeak & Seas, PLLC

[57] ABSTRACT

A thermosetting resin composition for a fixing treatment of electronic parts, which is able to adhere in short time at low temperature, has a heat resistance, is lowly hygroscopic, and hardly produces package cracks, etc.

The thermosetting resin composition comprises polycarbodiimide which is soluble in organic solvents and silicone-modified polyimide which is soluble in organic solvents, which are compounded.

5 Claims, No Drawings

THERMOSETTING RESIN COMPOSITION

FIELD OF THE INVENTION

The present invention relates to a novel thermosetting resin composition. The resin composition of the present invention is used as an adhesive for a fixing treatment of electric and electronic parts such as semiconductor chips.

BACKGROUND OF THE INVENTION

An adhesive in a form of paste and a product wherein an adhesive is applied to a heat-resistant material have been known as adhesives for fixing treatment of electric and electronic parts such as semiconductor chips, base plates and lead frames. Thermosetting resins such as epoxy resin, acrylic resin and rubber-phenol resin have been used as such adhesives, but they require high temperature and long time for setting by heating and workability for adhesion is poor. In addition, there are various problems such that, upon heat setting, large amount of volatile components are produced whereby lead is stained, and cracks generate upon a reflow soldering due to their high hygroscopicity. Thus, the conventional adhesives cannot be said to have a high reliability necessary for the fixing treatment of electric and electronic parts, and up to now, no satisfactory adhesives have been available.

Incidentally, a film adhesive of a hot melt type using a thermoplastic polyimide resin is able to adhere by heating with short time and an additional setting after adhesion is not necessary. However, its glass transition temperature is high and very high temperature is required for processing, so that there is a large possibility of thermal damage to an adherend.

On the other hand, when an adhesive having a low glass transition temperature is used to impart a processability at low temperature, there is a problem that heat resistance is low and reliability is significantly low. For example, polycarbodiimide has a low glass transition temperature and exhibits excellent adhesion and processability at low temperature, but its reliability is poor and, when exposed to an atmosphere at high temperature and high pressure for dozens of hours, the adhesive strength is lost. In order to solve such a disadvantage in polycarbodiimide, a siloxane skeleton may be introduced into its molecule to improve the relaibility. However, most of the commercially available siloxane-modified diisocyanate used as a monomer raw material is aliphatic, and therefore, there is a problem on reactivity when producing the polycarbodiimide. Moreover, synthesis of the siloxane-modified arylic diisocyanates is usually difficult and the products are unstable and are unable to be practically used. Accordingly, there has been a demand to improve the moisture resistance by blending polycarbodiimide with other polymers rather than by using polycarbodiimide alone.

An example of the substances that physical properties may be improved by blending the same with polycarbodiimide is bisaryl-substituted nadiimide. JP-A-7-286140 (the term "JP-A" used herein means an "unexamined Japanese patent application") proposes thermosetting coating materials having excellent heat resistance comprising the above-described nadiimide, JP-A-7-258353 proposes resin compositions comprising a blend of the above-described nadiimide and bismaleimide, and JP-A-7-330872 proposes resin compositions comprising a blend of the above described nadiimide and epoxy resin. However, no satisfactory result has been achieved in adhesive strength and flexibility when used as an adhesive.

Further, JP-A-62-1714, 5-239427 and 5-320611 propose adhesive resin compositions obtained by blending epoxy resin with polycarbodiimide resin. However, there is a problem in storage stability and hygroscopicity of epoxy resin, and no satisfactory result is achieved.

On the other hand, although polyimides usually have excellent heat resistance, in many cases they are insoluble in organic solvents and are not miscible with polycarbodiimide. Usually they are often used in the form of a solution of polyamide acids which are precursors thereof in order to improve the miscibility of polyimide with other polymers. However, when the polymer to be mixed therewith is polycarbodiimide, there is a problem that it reacts with the carboxyl groups in the polyamide acid whereupon the stability of the solution becomes significantly poor.

SUMMARY OF THE INVENTION

Intensive investigations have been made to obtain a resin composition which is able to adhere at low temperature within short time, exhibits high heat resistance and low hygroscopicity and hardly produces package cracks. As a result, it has been found that it is preferable to compound a soluble polyimide with a soluble polycarbodiimide resin. The present invention has been completed based on this finding.

Accordingly, one object of the present invention is to a resin composition comprising polycarbodiimide which is soluble in organic solvents and polyimide which is soluble in organic solvents.

Another object of the present invention is to provide an adhesive sheet comprising the thermosetting resin composition alone or comprising a support and the thermosetting resin composition provided thereon in the form of a sheet.

Preferred polycarbodiimide used in the resin composition of the present invention has a repeating unit represented by the following formula (1):

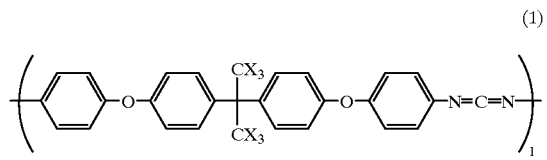

wherein X represents hydrogen atom or fluorine atom, and 1 is an integer of from 2 to 400.

Preferred polyimide contains repeating units represented by the following formula (2) and (3):

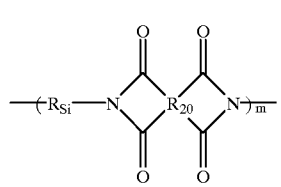

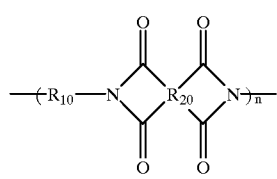

wherein $R_{Si}$ represents a silicone diamine residue; $R_{10}$ represents a diamine residue; $R_{20}$ represents an acid dianhydride residue; and (m+n) is an integer from 6 to 200, and also contain diamine and/or acid dianhydride structural unit containing a group represented by the following formula (4):

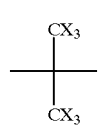

(4)

wherein X represents hydrogen atom or fluorine atom.

DETAILED DESCRIPTION OF THE INVENTION

(1) Polycarbodiimide

A first component in the resin composition of the present invention is polycarbodiimide which is soluble in organic solvents. Typical example of the preferred polycarbodiimide is represented by the following formula (1):

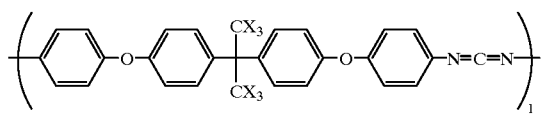

(1)

wherein X represents hydrogen atom or fluorine atom; and 1 is an integer of 2 to 400, and preferably 7 to 200.

If 1 is less than 2, reliability upon molding into film or the like is poor, and if it is more than 400, storage stability of solution is poor and the solution may not be durable in actual use.

This polycarbodiimide is prepared by polymerizing the corresponding diisocyanate by conventional method in the presence of a phosphorus type catalyst.

The diisocynate can also be prepared by conventional method. For example, the corresponding diamine such as 2,2-bis[4-(4-aminophenoxy)phenyl]propane (BAPP) or 2,2-bis[4-(4-aminophenoxy)-phenyl]hexafluoropropane (BAPF) is used as a precursor and is isocyanated using phosgene, diphenyl carbonate, trimethylchlorosilane, etc. Alternatively, the corresponding dicarboxylic acid may be used as a precursor of the isocyanate and then isocyanated by a Curtius degradation.

In producing polycarbodiimide by polymerizing diisocyanate, a single diisocyanate may be used alone or may be copolymerized with other diisocyanate in an amount of 60 mol % or less within such an extent that the property is not deteriorated. The diisocyante which can be used for the copolymerization is aromatic diisocyanates, and examples thereof are 1,3- or 1,4-bis(4-isocyanatophenoxy) benzene, 2,4- or 2,6-tolylene diisocyanate, 4,4'-diisocyanato-2,2'-dimethyl or bis(trifluoromethyl)biphenyl, diisocyanatodiphenylmethane, 1-methoxyphenyl-2,4-diisocyanate, 3,3'-dimethoxy-4,4'-diphenylmethane diisocyanate, 4,4'-diphenyl ether diisocyanate, 3,3'-dimethyl-4,4'-diphenyl ether diisocyanate and o-tolylene diisocyanate, although the present invention is not limited thereto.

The catalyst used for polymerization of the diisocyanate can be conventional phosphorus catalysts. For example, any of phosphorene oxides such as 1-phenyl-2-phosphorene-1-oxide, 3-methyl-2-phosphorene-1-oxide, 1-ethyl-2-phosphorene-1-oxide, 3-methyl-1-phenyl-2-phosphorene-1-oxide and 3-phosphorene isomers thereof can be used. The amount of the catalysts used is usually 0.1 to 20 mol %, preferably 0.3 to 10 mol %, and more preferably 0.5 to 5.0 mol %, per mole of the diisocyanate. If the amount of the catalyst used is too small, it is inactivated during the reaction and the reaction may stop. On the other hand, if it is too large, it may be difficult to control the reaction.

Reaction temperature in the polymerization is usually 50 to 200° C., preferably −10 to 150° C., and more preferably 20 to 120° C. The temperature can appropriately be modified depending upon the combination of the diisocynate and a solvent used. If the reaction temperature is too low, the reaction may not proceed at all. On the other hand, if the temperature is too high or heating is conducted too long, undesired side reactions may take place or the product may be decomposed. Accordingly, it is recommended that the temperature is gradually raised starting from low temperature by tracing the reaction with IR or the like.

The reaction solvent used can any solvent so long as it is able to dissolve or suspend the diisocyanate. Examples of the solvent are ether compounds such as tetrahydrofuran, dioxane or diethyl ether; halogenated hydrocarbons such as dichloromethane, chloroform, dichloroethane or tetrachloroethane; ketones such as acetone, methyl ethyl ketone, methyl isobutyl ketone or cyclohexanone; and aromatic hydrocarbons such as toluene, xylene or benzene. Those solvents may be used either alone or as mixtures thereof. If required and necessary, a part of or all of the solvent may be substituted in the course of the reaction, thereby changing the reaction temperature.

Concentration of diisocyanate in a reaction mixture is 1 to 50% by weight, preferably 5 to 40% by weight, and more preferably 10 to 30% by weight. If the concentration is too low, the reaction requires much time, which is not practical. On the other hand, if it is too high, a side reaction may take place or progress of the reaction may not be controlled, which is not preferred.

(II) Polyimide

The polyimide which is a second component in the resin composition of the present invention is polyimide which is soluble in organic solvents. Preferred polyimide is a polyimide containing a hexafluoroisopropylidene structure or an isopropylidene structure represented by the formula (4), together with a siloxane structural unit represented by $R_{Si}$ in the formula (2). Thus, the preferred polyimide is that (a) the polyimide has repeating units represented by the following formulae (2) and (3):

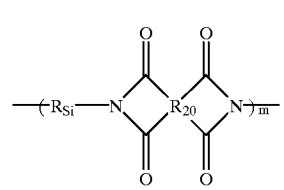

(2)

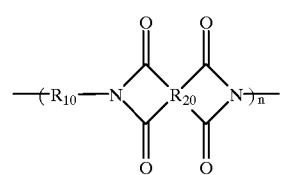

(3)

wherein $R_{Si}$ represents a silicone diamine residue; $R_{10}$ represents a diamine residue; $R_{20}$ represents an acid dianhydride residue; and (m+n) is an integer of from 6 to 200;

(b) the content of silicone-modified diamine structural unit in the diamine structure unit is 10 to 100%; and (c) the ratio of the total amount (b) of diamine and acid anhydride structural unit containing hexafluoroisopropylidene structure or isopropylidene structure represented by the following formula (4):

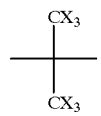
(4)

wherein X represents hydrogen atom or fluorine atom, to the total amount (a) of acid dianhydride structural unit and diamine structural unit excluding silicone-modified diamine structural unit, i.e. b/a, is from 10 to 100%.

The polyimide having such a structure is well miscible with polycarbodiimide and the resulting resin composition has a high adhesion to chips.

In addition, if the value of (m+n) is lower than the above-described range, reliability of the resin may be decreased, and if it is higher than the above range, miscibility may become poor.

The monomer is described below, which is necessary for introducing (i) a silicone-modified diamine having a siloxane structure represented by the formula (2); and (ii) a structural unit represented by the formula (4) (isopropylidene structure or hexafluoroisopropylidene structure), which are essential structures in the soluble polyimide main chain of the present invention.

(i) Silicone-modified diamine.

The silicone-modified diamine used for introducing siloxane structure ($R_{Si}$: siliconediamine residue) into polyimide is preferably a diaminopolysiloxane represented by the following formula (5):

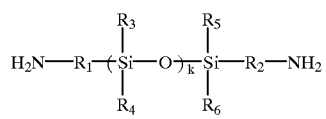
(5)

wherein $R_1$ and $R_2$ each represent a divalent hydrocarbon residue; $R_3$ to $R_6$ each represent a hydrocarbon residue having 1 to 6 carbon atoms, and preferably methyl or ethyl; and k is an integer of 1 to 20, and preferably 1 to 6. $R_1$ and $R_2$ are preferably an alkylene group comprising methylene chains, and an arylene group which is an aromatic divalent group, with $R_1$ and $R_2$ being more preferably the same group. Specific examples of the diaminopolysiloxane compound are the following diamines.

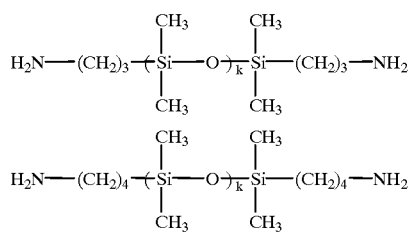

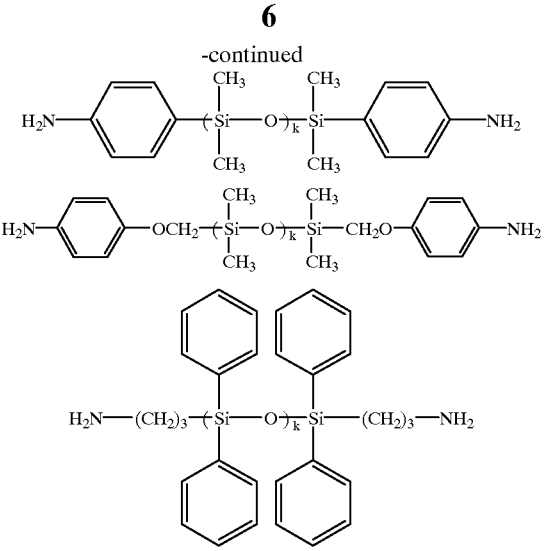

Those silicone-modified diamines may be used alone or as mixtures of two or more thereof. The content of the silicone-modified diamine structural unit in the diamine structural unit is 10 to 100 mol %, and more preferably 20 to 80 mol %. If the content of the silicone-modified diamine structural unit is less than the above, improvement in miscibility and adhesion is insufficient, and if it is more than the above, such is economically disadvantageous.

(ii) Monomer introducing the structural unit of the formula (4)

Monomers for introducing the isopropylidene structural unit or hexafluoroisopropylidene structural unit represented by the above formula (4) are explained.

Examples of the monomer which introduces those structural units are the following diamines excluding silicone-modified diamines, and carboxylic acid dianhydrides.

(ii-a) Diamines excluding silicone-modified diamines (which introduce a diamine residue, i.e. $R_{10}$)

Examples of the diamines are 2,2-bis[4-(3-aminophenoxy)phenyl]propane, 2,2-bis[4-(4-aminophenoxy)phenyl]propane, 2,2-bis[4-(3-aminophenoxy)phenyl]hexafluoropropane and 2,2-bis[4-(4-aminophenoxy)-phenyl]hexafluoropropane.

(ii-b) Carboxylic acid dianhydrides (which introduce an acid dianhydride residue, i.e. $R_{20}$)

Examples of the tetracarboxylic acid dianhydride are 2,2-bis(2,3- or 3,4-dicarboxyphenyl)propane dianhydride and 2,2-bis(2,3- or 3,4-dicarboxyphenyl)hexafluoropropane dianhydride.

The total amount (b) of the carboxylic acid dianhydride structural unit and the diamine structural unit having the structural unit represented by the formula (4) is 10 to 100 mol %, and preferably 30 to 100 mol %, to the total amount (a) of the acid dianhydride structural unit and the diamine structural unit other than the silicone-modified diamine structural unit. If the (b/a) ratio is less than 10%, polycarbodiimide may not be miscible therewith.

(iii) Other diamine components (which introduce $R_{10}$ other than the above)

Other diamine components which can be used together with the above-described diamine components can be any one so long as it is an aromatic diamine. Examples of the aromatic diamine are p- or m-phenylenediamine, 4,4'-, 3,4'-, 2,4'- or 3,3'-diaminodiphenyl ether, 4,4'-, 3,4'- or 3,3'-diaminodi-phenylsulfone, 4,4'-, 3,4'- or 3,3'-diaminodiphenyl sulfide, 4,4'-, 3,4'- or 3,3'-diaminobenzophenone, 4,4'-, 3,4'- or 3,3'- diaminodiphenylpropane, 4,4'-, 3,4'- or 3,3'-diaminodiphenyl-hexafluoropropane, bis[4-(3- or 4-diaminophenoxy)phenyl]-methane, 1,3-bis(3-aminophenoxy)benzene, 4,4'-bis(4-aminophenoxy) biphenyl, bis[4-(3- or 4-aminophenoxy)phenyl-sulfone and bis[4-(3- or 4-aminophenoxy)phenyl] ether. Those may be used alone or as mixtures of two or more thereof.

(iv) Other acid anhydrides (which introduce $R_{20}$ other than above)

The other acid anhydride is a tetracarboxylic acid dianhydride other than the tetracarboxylic acid dianhydride having the structural unit represented by the above formula (4). Examples of the carboxylic acid dianhydride which can be used in the reaction with the above diamine components are pyromellitic acid dianhydride, 2,2',3,3'- or 3,3',4,4'-biphenyl tetracarboxylic acid dianhydride, oxydiphthalic acid dianhydride, 2,2',3,3'-benzophenone tetracarboxylic acid dianhydride, 3,3',4,4'-benzophenone tetracarboxylic acid dianhydride, 2,2-bis(3,4-dicarboxyphenyl)sulfone dianhydride, bis(2,3- or 3,4-dicarboxyphenyl)methane dianhydride, 2,3,6,7-naphthalenetetracarboxylic acid dianhydride, 1,4,5,8-naphthalenetetracarboxylic acid dianhydride, bis(2,3- or 3,4-dicarboxyphenyl) difluoromethane dianhydride, 1,3-bis(3,4-dicarboxyphenyl)-1,1,3,3-tetramethyldisiloxane and derivatives thereof. Those are used alone or as mixtures of two or more thereof.

(Production Method of Polyimide)

Polyimide which is soluble in organic solvents can be synthesized by conventional method per se. That is, the above diamine is reacted with nearly equimolar amount of tetracarboxylic acid dianhydride in a solvent to prepare a polyamic acid (a precursor of polyimide), and the resulting polyamic acid is imidized either by heating or by chemical means to obtain the polyimide.

The chemical imidation is, for example, that a dehydrating agent such as dicyclohexylcarbodiimide, trifluoroacetic anhydride, thionyl chloride or phosphorus trichloride is added to polyamic acid, the resulting mixture is subjected to a ring-closure reaction with stirring, if necessary, with cooling. The resulting reaction mixture was filtered off, the filtrate obtained is poured into a precipitating agent such as 2-propanol to precipitate the reaction product. The precipitate is filtered off, washed and dried to obtain a desired polyimide powder.

On the other hand, the imidization by heating can be conducted by heating a solution of polyamiic acid at the temperature of 150° C. or higher to conduct a dehydrating ring-closure reaction. In order to efficiently remove the by-produced water into the outside of the system, a solvent such as xylene or toluene may be present together. In addition, the imidization rate may be promoted using an organic base such as triethylamine, isoquinoline or pyridine. The polyimide prepared by imidization by heating may be used either as it is or by forming a powder by precipitating the same in 2-propanol or methanol followed by redissolving in organic solvent.

The organic solvent which can be used in the above polymerization reaction includes N-methyl-2-pyrrolidone, N,N-dimethylacetamide, N,N-dimethylformamide, 1,3-dimethyl-2-imidazolinone, dimethyl sulfoxide, dimethyl sulfide, dimethylsulfone, pyridine, tetramethylurea, diglyme, triglyme, tetrahydrofuran, dioxane and cyclohexanone. Those may be used alone or as mixtures thereof.

If required and necessary, the soluble polyimide of the present invention may be end-blocked using phthalic anhydride or derivatives thereof or aniline or derivatives thereof.

(Preparation of the Composition)

A resin solution comprising the polycarbodiimide of the present invention as a main component may be prepared by either a method that the soluble polyimide powder is added to and dissolved in a polycarbodiimide solution, or a method that the soluble polyimide powder is previously dissolved in an organic solvent and the resulting solution of the soluble polyimide is mixed with a solution of polycarbodiimide. The organic solvent used there can be any organic solvent so long as it is capable of dissolving both soluble polyimide and polycarbodiimide. Specifically, the same organic solvents as used in the above-described polymerization may be used.

The amount of the soluble polyimide in the resin composition of the present invention is 0.1 to 50 parts by weight, preferably 1 to 30 parts by weight, and more preferably 2 to 20 parts by weight, per 100 parts by weight of the polycarbodiimide which is the main component. If the amount of the soluble polyimide is too small, its inherent property cannot be exhibited. On the other hand, if it is too large, the characteristics of the polycarbodiimide, such as low Tg and low hygroscopicity, are lost. In addition, a phase separation may occur in the resin.

The heat-resistant resin composition of the present invention may be compounded with a fine inorganic filler in such an amount that the processability and heat resistance of the resin composition do not deteriorate. Further, various additives such as antifoaming agent, leveling agent or smoothening agent, for obtaining surface smoothness may be added, if required and necessary.

(Adhesive Sheet)

Varnish comprising the polycarbodiimide of the present invention as the main component may be molded into film by a conventional method, thereby obtaining an adhesive sheet. Thickness of the sheet is usually 1 to 2000 μm, but the thickness is not limited thereto and may be suitably decided depending on the adhesive purpose. In addition, shape and size of the sheet may be suitably changed depending on an adherend such as lead frame or semiconductor chips.

In forming an adhesive sheet, one or more of various inorganic powder comprising metal or alloy (such as aluminum, copper, silver, gold, nickel, chromium, lead, tin, zinc, palladium and solder), ceramics (such as alumina, silica, magnesia and silicon nitride), carbon, etc., can be blended, if necessary, for the purpose of imparting electroconductivity, improving the heat transmission and controlling elasticity, especially achieving high elasticity.

Coating temperature of the film is 20 to 300° C., preferably 50 to 250° C. or, and more preferably 70 to 200° C. If the coating temperature is lower than 20° C., the solvent may remain in the film, and if it is higher than 300° C., thermosetting of the film may proceed.

Further, the film may be formed on a support. In preparing an adhesive sheet of such a constitution, varnish may be applied on the support or the already-formed film may be laminated on the support by pressing or the like.

Metal foil, insulating film, etc. can be used as the support. Examples of the metal foil which can be used include aluminum, copper, silver, gold, nickel, indium, chromium, lead, tin, zinc, palladium, etc. Those may be used alone or an alloy comprising two or more metals. The insulating film can be any film so long as it has heat resistance and chemical resistance. Examples of the insulating film include polyimide, polyester, polyethylene terephthalate, etc.

Each of the metal foil and the insulating film may be used solely or they may be used in a form of a laminated support in two or more layers having a constitution of, for example, metal foil/insulating film, prepared by layering them.

Example of two-layered substrate is copper/polyimide two-layered substrate.

The adhesive sheet of the present invention develops a strong adhesion due to thermosetting by a heating treatment and, at the same time, it gives a lowly hygroscopic cured product. Heat treatment may be conducted by an appropriate manner such as by heater, ultrasonic wave or ultraviolet ray. Therefore, the adhesive sheet of the present invention can preferably be used for an adhesive treatment of various materials and is particularly preferably used in a fixing treatment of electric and electronic parts represented by semiconductor chips and lead frames which are required to have a low hygroscopicity.

The adhesive sheet of the present invention is excellent in having a low hygroscopicity, a high flexibility, resulting in easy handling, a good adhesion to semiconductor elements and a good storage stability.

Metal foil with an adhesive layer prepared by applying a varnish which is the resin composition of the present invention on one side of metal foil followed by drying is particularly useful in the production of multi-layered circuit substrates and the like.

The thermosetting resin composition of the present invention will now be further described by reference to the following examples and comparative examples.

Characteristics of the resulting resin compositions were measured by the following methods.

Glass Transition Temperature (Tg):

The sample was heated from room temperature to 400° C. at the temperature raising rate of 10° C./minute using Seiko SSC/560M (manufactured by Seiko Corp.).

Adhesion:

Resin varnish was spin-coated on a silicone wafer. The coated silicone wafer was allowed to stand in a pressure cooker (TABAI PRESSURE COOKER TPC-411) of 120° C./100% RH. Degree of contact adhesion between the resin and the silicone wafer was evaluated before and after the heat treatment. The evaluation method was that the number of checkers peeled from 100 checkers of 1 mm square is defined as "n" and n/100 was adopted for the evaluation (a cross-cutting test). Adhesive strength was measured in terms of a 180° peeling strength using Shimadzu Autograph AGS-100D.

SYNTHESIS EXAMPLE 1

Synthesis of Polyimide 1:

Into a 500 ml separable flask equipped with a condenser and a stirrer were charged 21.72 g (42 mmol) of 2,2-bis[4-(4-aminophenoxy)phenyl] hexafluoropropane (BAPF), 10.70 g (42 mmol) of bis(aminopropyl) tetramethyldisiloxane (APDS) and 186 g of N-methyl-2-pyrrolidone (NMP). 30.02 g (84 mmol) of 2,2-bis(3,4-dicarboxyphenyl)sulfone dianhydride was poured thereinto with stirring at room temperature. The resulting mixture was stirred at room temperature for 3 hours and then at 180° C. for 4 hours to conduct imidation by heating. A varnish thus obtained was reprecipitated in methanol and filtered to take out a powder. The powder was dried at 150° C. for 1 hour and redissolved in cyclohexanone to prepare a varnish of 30% by weight (hereinafter referred to as "PI1").

SYNTHESIS EXAMPLE 2

Synthesis of Polyimide 2:

Varnish of polyimide (hereinafter referred to as "PI2") was prepared in the same manner as in Synthetic Example 1 above except that 20.35 g (42 mmol) of bis[4-(3-aminophenoxy)phenyl]-sulfone (3-BAPS) and 10.70 g (42 mmol) of bis(aminopropyl)-tetramethyldisiloxane (APDS) were used as diamine components and 37.3 g (84 mmol) of 2,2-bis(3,4-dicarboxyphenyl) hexafluoropropane dianhydride was used as an acid anhydride.

SYNTHESIS EXAMPLE 3

Synthesis of Polycarbodiimide:

Into a 10 liters separable flask equipped with a dropping funnel, a condenser and a stirrer were charged 800 g (1.54 mol) of 2,2-bis[4-(4-aminophenoxy)phenyl]hexafluoropropane (BAPF), 312 g (3.09 mol) of triethylamine and 8 liters of toluene. BAPF was completely dissolved by heating, and 183 g (3.09 mol) of phenyl chloroformate was dropped thereinto. The resulting mixture was cooled with an ice bath to suppress the generation of heat and stirred overnight to complete the reaction. Triethylamine (281 g; 2.78 mol) was charged thereinto and 302 g (:2.78 mol) of trimethylchlorosilane placed in a dropped funnel was dropped thereinto at room temperature. After the completion of dropping, 29.7 g (0.154 mol) of 3-methyl-1-phenyl-2-phosphorene-1-oxide was charged thereinto as a catalyst for carbodiimidization and the resulting mixture was stirred for 9 hours with a gradual raising of the temperature up to 80° C. After ascertaining the completion of the reaction by IR, the reaction mixture was cooled down to room temperature and salts formed were filtered off. Solvent of the resulting varnish was substituted with cyclohexanone to obtain a 20 wt % solution. Hereinafter, this varnish is called "PCD".

EXAMPLE 1

The above PI1 and PCD were mixed in a solid ratio as shown in the following Table 1 to prepare a varnish. Each of those varnish products was compatible each other without phase separation. The resulting varnish was spin-coated on a silicone wafer, dried at 90° C. for 30 minutes and subjected to heat treatment at 250° C. for one hour. A test for moisture resistance was then conducted by a pressure cooker test (PCT). Table 1 shows physical properties the respective varnish and evaluation results of adhesion (cross cutting test).

TABLE 1

| Varnish No. | Varnish Composition (part by weight) | | Tg(° C.) | Adhesive Property | |
|---|---|---|---|---|---|
| | PCD | PI1 | | Initial value | After PCT treatment (after 20 hrs) |
| 1 | 100 | 0 | 150 | 0/100 | 100/100 |
| 2 | 100 | 2.5 | 155 | 0/100 | 13/100 |
| 3 | 100 | 5 | 159 | 0/100 | 0/100 |

EXAMPLE 2

PI2 synthesized in Synthesis Example 2 was used as a polyimide and mixed with PCD in a mixing ratio as shown in Table 2 to prepare varnish. Those varnish products were miscible each other without phase separation. Each of the resulting varnish products was treated and evaluated in the same manner as in Example 1. Table 2 shows physical properties of the varnishes and results of a cross cutting test of those varnish products.

TABLE 2

| Varnish No. | Varnish Composition (part by weight) PCD | PI2 | Tg(° C.) | Adhesive Property Initial value | After PCT treatment (after 20 hrs) |
|---|---|---|---|---|---|
| 4 | 100 | 2.5 | 151 | 0/100 | 20/100 |
| 5 | 100 | 5 | 153 | 0/100 | 0/100 |

EXAMPLE 3

The varnish No. 3 prepared in Example 1 was cast on a copper foil (35 μm) and dried at 200° C. for 20 minutes to prepare an adhesive sheet (thickness: 20 μm). This was stuck on a 42 alloy plate and those were adhered by compressing under a pressure of 50 kg/cm² at 350° C. for 2 seconds. The adhesive strength was measured and found to be 1,400 g/cm. The adhesive strength after placing this in a constant temperature and humidity bath of 80° C./90% RH was 800 g/cm.

EXAMPLE 4

Adhesive strength of the varnish No. 5 prepared in Example 2 was measured in the same manner as in Example 3 and found to be 1,200 kg/cm under ordinary state. The adhesive strength after placing this in a constant temperature and humidity bath of 80° C./90% RH for 168 hours was 750 g/cm.

COMPARATIVE EXAMPLE 1

The varnish No. 1 prepared in Example 1 was subjected to a measurement of adhesive strength in the same manner as in Example 3 and the adhesive strength was found to be 1,400 cm/g under ordinary state. When this was placed in a constant temperature and humidity bath of 80° C./90% RH for 168 hours, separation was observed.

COMPARATIVE EXAMPLE 2

Polyimide varnish was prepared in the same manner as in Synthesis Example 1 except that 3,3'-diaminodiphenylsulfone, bis(amino-propyl)tetramethyl disiloxane (APDS) and oxydiphthalic acid dianhydride (ODPA) were used as monomers. The resulting polyimide was not miscible with PCD and, when mixed, they were separated into the respective phases.

COMPARATIVE EXAMPLE 3

A polyether imide varnish (manufactured by General Electric) and PCD were mixed. However, due to lack of their miscibility, they were separated into respective phases.

The resin composition of the present invention has a glass transition temperature of 200° C. or lower, and therefore, its processability at low temperature is improved. Further, it shows good adhesion to adherends such as semiconductor element, and excellent storage stability due to low hygroscopicity, so that it can be preserved for long period of time at ambient temperature.

While the invention has been described in detail and with reference to specific embodiments thereof, it will be apparent to one skilled in the art that various changes and modifications can be made therein without departing from the spirit and scope thereof.

What is claimed is:

1. A thermosetting resin composition comprising polycarbodiimide which is soluble in organic solvents and polyimide which is soluble in organic solvents.

2. The thermosetting resin composition as claimed in claim 1, wherein said polycarbodiimide is represented by the following formula (1):

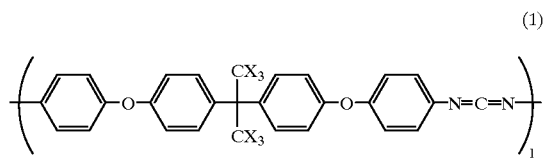

(1)

wherein X represents hydrogen atom or fluorine atom and 1 is an integer of 2 to 400.

3. The thermosetting resin composition as claimed in claim 1, wherein
(i) said polyimide has a repeating unit represented by the following formulae (2) and (3):

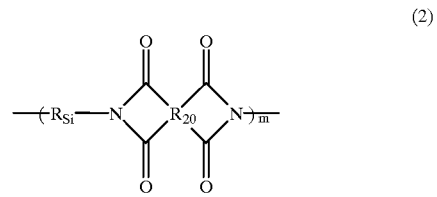

(2)

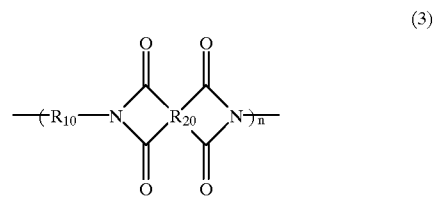

(3)

wherein $R_{si}$ represents a silicone diamine residue; $R_{10}$ represents a diamine residue; $R_{20}$ represents an acid dianhydride residue; and (m+n) is an integer of from 6 to 200;
(ii) the ratio of the amount of $R_{si}$ to the total amount of $R_{si}$ and $R_{10}$ in the polyimide is from 0.1 to 1; and
(iii) said polyimide has a group represented by the following formula (4), which is present in at least one of $R_{10}$ and $R_{20}$ and the ratio of the total amount (b) of $R_{10}$ having a group of formula (4) and $R_{20}$ having a group of formula (4) to the total amount of $R_{10}$ and $R_{20}$ is from 0.1 to 1:

(4)

wherein X represents hydrogen atom or fluorine atom.

4. A film comprising the resin composition as claimed in claim 1, 2 or 3, in the form of a film.

5. An adhesive sheet comprising a support and an adhesive layer comprising the resin composition as claimed in claim 1, 2 or 3, formed on at least one side of the support.

* * * * *